United States Patent
Adermann et al.

(10) Patent No.: US 9,342,139 B2
(45) Date of Patent: May 17, 2016

(54) PAIRING A COMPUTING DEVICE TO A USER

(75) Inventors: Stan Adermann, Redmond, WA (US); Jeffrey Kinsey, Redmond, WA (US); Richard Hanks, Seattle, WA (US); John Ikeda, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 460 days.

(21) Appl. No.: 13/330,528

(22) Filed: Dec. 19, 2011

(65) Prior Publication Data

US 2013/0154917 A1   Jun. 20, 2013

(51) Int. Cl.
*G09G 5/00*   (2006.01)
*G06F 3/00*   (2006.01)
*G06F 3/033*   (2013.01)
*G06F 3/038*   (2013.01)

(52) U.S. Cl.
CPC .............. *G06F 3/005* (2013.01); *G06F 3/033* (2013.01); *G06F 3/038* (2013.01)

(58) Field of Classification Search
CPC ........... G06F 3/00; G06F 3/033; G06F 3/005; G06F 3/038; H04N 5/76; H04N 5/783; H04N 9/80; G09G 5/00; G05B 1/01
USPC .............. 386/248, 296, 349, 686.6; 701/201; 382/190; 726/3, 17; 455/411, 414.1, 455/466; 345/156–158, 173, 174; 715/745
See application file for complete search history.

(56) References Cited

U.S. PATENT DOCUMENTS

| | | | |
|---|---|---|---|
| 4,627,620 A | 12/1986 | Yang | |
| 4,630,910 A | 12/1986 | Ross et al. | |
| 4,645,458 A | 2/1987 | Williams | |
| 4,695,953 A | 9/1987 | Blair et al. | |
| 4,702,475 A | 10/1987 | Elstein et al. | |

(Continued)

FOREIGN PATENT DOCUMENTS

| | | |
|---|---|---|
| CN | 201254344 B | 6/2010 |
| EP | 0583061 A2 | 2/1994 |

(Continued)

OTHER PUBLICATIONS

Bonsor, et al., "How Facial Recognition Systems Work", Retrieved at <<http://electronics.howstuffworks.com/gadgets/high-tech-gadgets/facial-recognition2.htm>>, Retrieved Date: Sep. 1, 2011, p. 1.

(Continued)

*Primary Examiner* — Lun-Yi Lao
*Assistant Examiner* — Johny Lau
(74) *Attorney, Agent, or Firm* — Aaron Chatterjee; Judy Yee; Micky Minhas (57) ABSTRACT

A method for automatically pairing an input device to a user is provided herein. According to one embodiment, the method includes receiving an input from an unpaired input device within an observed scene, and calculating a position of the unpaired input device upon receiving the input. The method further includes detecting one or more users within the observed scene via a capture device, creating a candidate list of the one or more detected users determined to be within a vicinity of the unpaired input device, and assigning one detected user on the candidate list to the unpaired input device to initiate pairing.

20 Claims, 5 Drawing Sheets

(56) References Cited

U.S. PATENT DOCUMENTS

| | | | |
|---|---|---|---|
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson et al. |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,259,747 B2 | 8/2007 | Bell |
| 7,308,112 B2 | 12/2007 | Fujimura et al. |
| 7,317,836 B2 | 1/2008 | Fujimura et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,701,439 B2 | 4/2010 | Hillis et al. |
| 7,702,130 B2 | 4/2010 | Im et al. |

(56) References Cited

U.S. PATENT DOCUMENTS

| | | | |
|---|---|---|---|
| 7,704,135 | B2 | 4/2010 | Harrison, Jr. |
| 7,710,391 | B2 | 5/2010 | Bell et al. |
| 7,729,530 | B2 | 6/2010 | Antonov et al. |
| 7,746,345 | B2 | 6/2010 | Hunter |
| 7,760,182 | B2 | 7/2010 | Ahmad et al. |
| 7,809,167 | B2 | 10/2010 | Bell |
| 7,834,846 | B1 | 11/2010 | Bell |
| 7,852,262 | B2 | 12/2010 | Namineni et al. |
| RE42,256 | E | 3/2011 | Edwards |
| 7,898,522 | B2 | 3/2011 | Hildreth et al. |
| 7,976,372 | B2 | 7/2011 | Baerlocher et al. |
| 8,035,612 | B2 | 10/2011 | Bell et al. |
| 8,035,614 | B2 | 10/2011 | Bell et al. |
| 8,035,624 | B2 | 10/2011 | Bell et al. |
| 8,072,470 | B2 | 12/2011 | Marks |
| 2004/0190776 | A1* | 9/2004 | Higaki et al. ............ 382/190 |
| 2006/0202952 | A1* | 9/2006 | Sato et al. ............... 345/156 |
| 2008/0026838 | A1 | 1/2008 | Dunstan et al. |
| 2008/0106517 | A1* | 5/2008 | Kerr et al. .............. 345/158 |
| 2009/0138805 | A1* | 5/2009 | Hildreth .................. 715/745 |
| 2009/0253410 | A1* | 10/2009 | Fitzgerald et al. ......... 455/411 |
| 2010/0208942 | A1 | 8/2010 | Porter et al. |
| 2010/0273130 | A1 | 10/2010 | Chai et al. |
| 2011/0021271 | A1* | 1/2011 | Ikeda et al. ............. 463/30 |
| 2011/0069940 | A1* | 3/2011 | Shimy et al. ............ 386/296 |
| 2011/0111846 | A1 | 5/2011 | Ciarrocchi |
| 2011/0118032 | A1 | 5/2011 | Zalewski |
| 2011/0159959 | A1* | 6/2011 | Mallinson et al. .......... 463/37 |
| 2011/0202269 | A1* | 8/2011 | Reventlow ................ 701/201 |
| 2011/0291929 | A1* | 12/2011 | Yamada et al. ............ 345/158 |
| 2012/0202597 | A1* | 8/2012 | Yee et al. ............... 463/37 |
| 2012/0254986 | A1* | 10/2012 | Levien et al. ............ 726/17 |
| 2013/0176106 | A1* | 7/2013 | Schultz et al. ............ 340/5.52 |

FOREIGN PATENT DOCUMENTS

| | | | |
|---|---|---|---|
| JP | 08044490 | A1 | 2/1996 |
| WO | 93/10708 | A1 | 6/1993 |
| WO | 97/17598 | A1 | 5/1997 |
| WO | 99/44698 | A1 | 9/1999 |
| WO | WO 2012037618 | A1 * | 3/2012 |

OTHER PUBLICATIONS

"The Kinect Robot", Retrieved at <<http://www.robots-and-androids.com/kinect-robot.html>>, Retrieved Date: Sep. 1, 2011, p. 1.

Dbrendant, "Project Natal: Targeted Advertising, a Biometric Nightmare", Retrieved at <<http://eyetrackingupdate.com/2010/05/11/project-natal-targeted-advertising-biometric-nightmare/>>, May 11, 2010, pp. 2.

Kanade et al., "A Stereo Machine for Video-rate Dense Depth Mapping and its New Applications", IEEE Computer Society Conference on Computer Vision and Pattern Recognition, 1996, pp. 196-202,The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Non-rigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collusion of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

\* cited by examiner

PAIRING A COMPUTING DEVICE TO A USER

BACKGROUND

Computing devices are becoming increasingly more interactive. Further, various different computing devices may be communicatively linked so as to provide an enhanced computing experience for each user. For example, a user may provide input via a wireless device to control aspects of a gaming computing device. Such a wireless device may be utilized by various different users, and such users may desire to identify themselves upon taking control of the wireless device. One prior approach prompts a user to enter a user name and/or passphrase to gain access to the gaming computing device. However, such an approach interrupts gameplay, which detracts from the gaming experience and causes user frustration.

SUMMARY

A method for automatically pairing an input device to a user is provided herein. According to one embodiment, the method includes receiving an input from an unpaired input device within an observed scene, and calculating a position of the unpaired input device upon receiving the input. The method further includes detecting one or more users within the observed scene via a capture device, creating a candidate list of the one or more detected users determined to be within a vicinity of the unpaired input device, and assigning one detected user on the candidate list to the unpaired input device to initiate pairing.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Aspects of this disclosure will now be described by example and with reference to the illustrated embodiments listed above.

Figure 1:
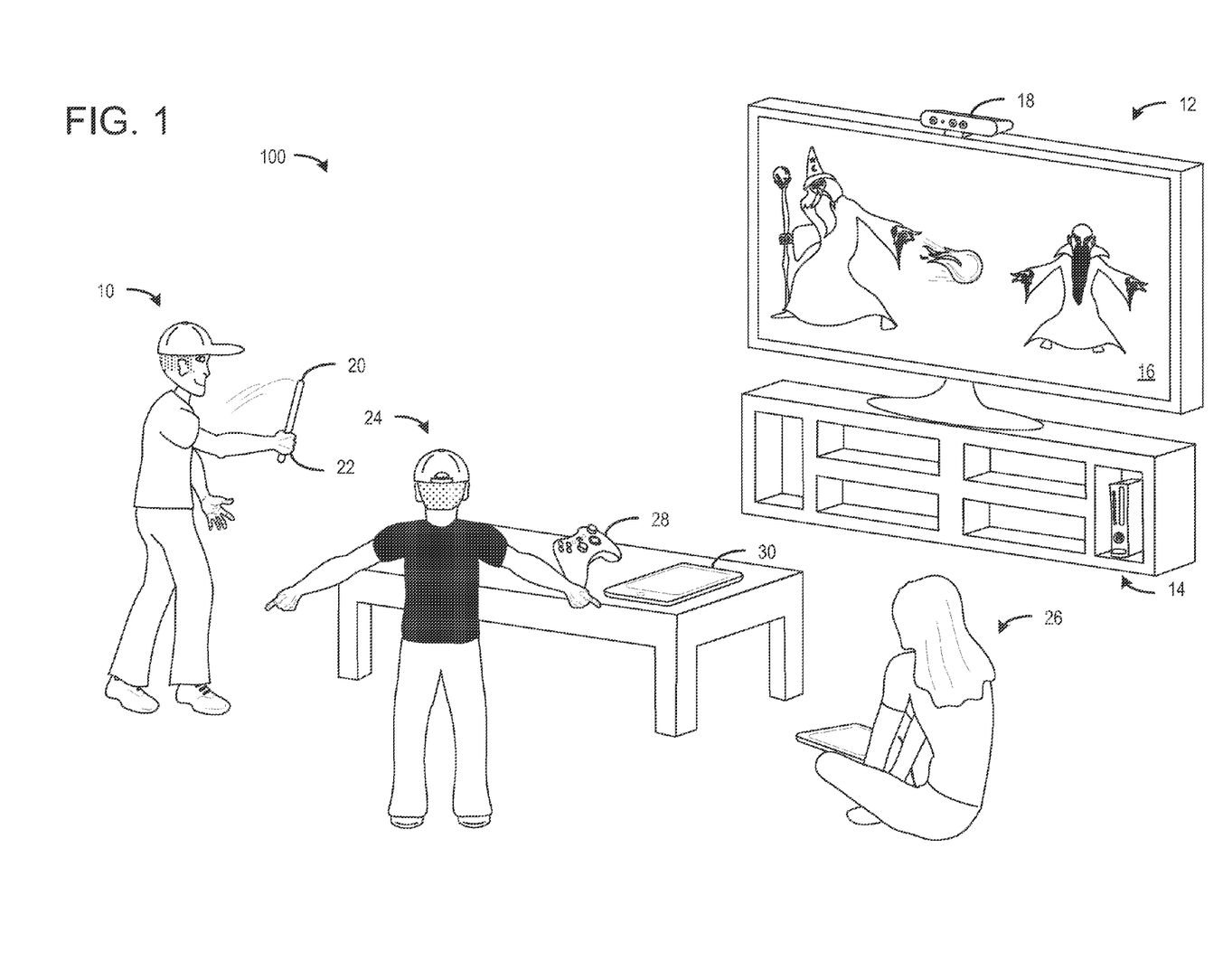
FIG. 1 schematically shows an example computing environment including an example mobile device according to an embodiment of the present disclosure.

FIG. 1 shows an example 3D interaction space 100 in which user 10 is located. FIG. 1 also shows gaming system 12 which may enable user 10 to interact with a video game. Gaming system 12 may be used to play a variety of different games, play one or more different media types, and/or control or manipulate non-game applications and/or operating systems. Gaming system 12 may include gaming console 14 and display device 16, which may be used to present game visuals to game players. Gaming system 12 is a type of computing device, the details of which will be discussed with respect to FIG. 6.

Turning back to FIG. 1, 3D interaction space 100 may also include a capture device 18 such as a camera, which may be coupled to gaming system 12. Capture device 18, for example, may be a depth camera used to observe 3D interaction space 100 by capturing images. Thus, 3D interaction space may also be referred to herein as an observed scene. As such, capture device 18 may be used to capture images of user 10 which may be used to identify user 10. For example, user 10 may be identified by a physical attribute unique to user 10 by employing three-dimensional imaging, facial recognition, biometrics, or another user identifying technology. Further, in some embodiments, a presence of user 10 may be detected without determining an identity of the user.

As shown, user 10 is holding an input device 20 with right hand 22. User 10 may interact with input device 20 to control aspects of gaming system 12. In the depicted example, input device 20 is a magic wand which may be used to cast spells in a wizard game, for example. Because a position of input device 20 is within a vicinity of right hand 22, input device 20 may be automatically paired to user 10. For example, capture device 18 and/or another sensor of computing system 12 may determine a position of input device 20 and a position of user 10. Further, computing system 12 may determine that user 10 is a nearest user to input device 20. As described in more detail below, the nearest user to an input device may be automatically paired to the input device.

FIG. 1 further shows a second user 24 and a third user 26. The second and third users may also be present within 3D interaction space 100, thus, the second and third users may also be observed by capture device 18. As shown, second and third users are farther from input device 20 than user 10. Therefore, the second user and the third user may be at a position that is not within the vicinity of input device 20. As such, neither user 24 nor user 26 may be paired to input device 20.

FIG. 1 further shows various unpaired computing devices, such as controller 28 and mobile computing device 30. Such devices may be unpaired because the devices are idle. In other words, neither user 10, user 24, nor user 26 is interacting with controller 28 or mobile computing device 30; therefore, computing system 12 is not receiving input from either device. As such, controller 28 and mobile device 30 may be in an unpaired state. However, such devices may be automatically paired to a user when computing system 12 receives input from an unpaired device. For example, user 24 may pick up controller 28 and press a button to block the casted spell, and computing system 12 may automatically pair controller 28 to user 24 upon receiving the input of the pressed button.

It will be appreciated that FIG. 1 is provided by way of example, and thus, is not meant to be limiting. Therefore, it is to be understood that a wizard game is provided to illustrate a general concept, and various other games and non-game applications are possible without departing from the scope of this disclosure.

Further, it will be appreciated that a user may interact with the input device in any suitable way. Therefore, it is to be understood that user 10 interacting with the input device using right hand 22 is provided by way of example, and thus, is not meant to be limiting. For example, user 10 may interact with an input device using a left hand. As another example, the input device may be attached to a body portion of user 10, such as a leg, a knee, a shoulder, an elbow, or another body portion. In this way, the user may interact with an input device attached to the user's body, and a position of such an input device may be determined and associated with a particular body portion to which the input device is attached. For example, the computing system may determine that the attached input device and the associated body portion are co-localized, and thus may be moving similarly. As such, the computing system may determine that the user is interacting with the attached input device. Continuing with the above example, user 10 may attach a shield input device to a forearm and such an attached input device may be used to shield a casted spell, for example.

Figure 2:
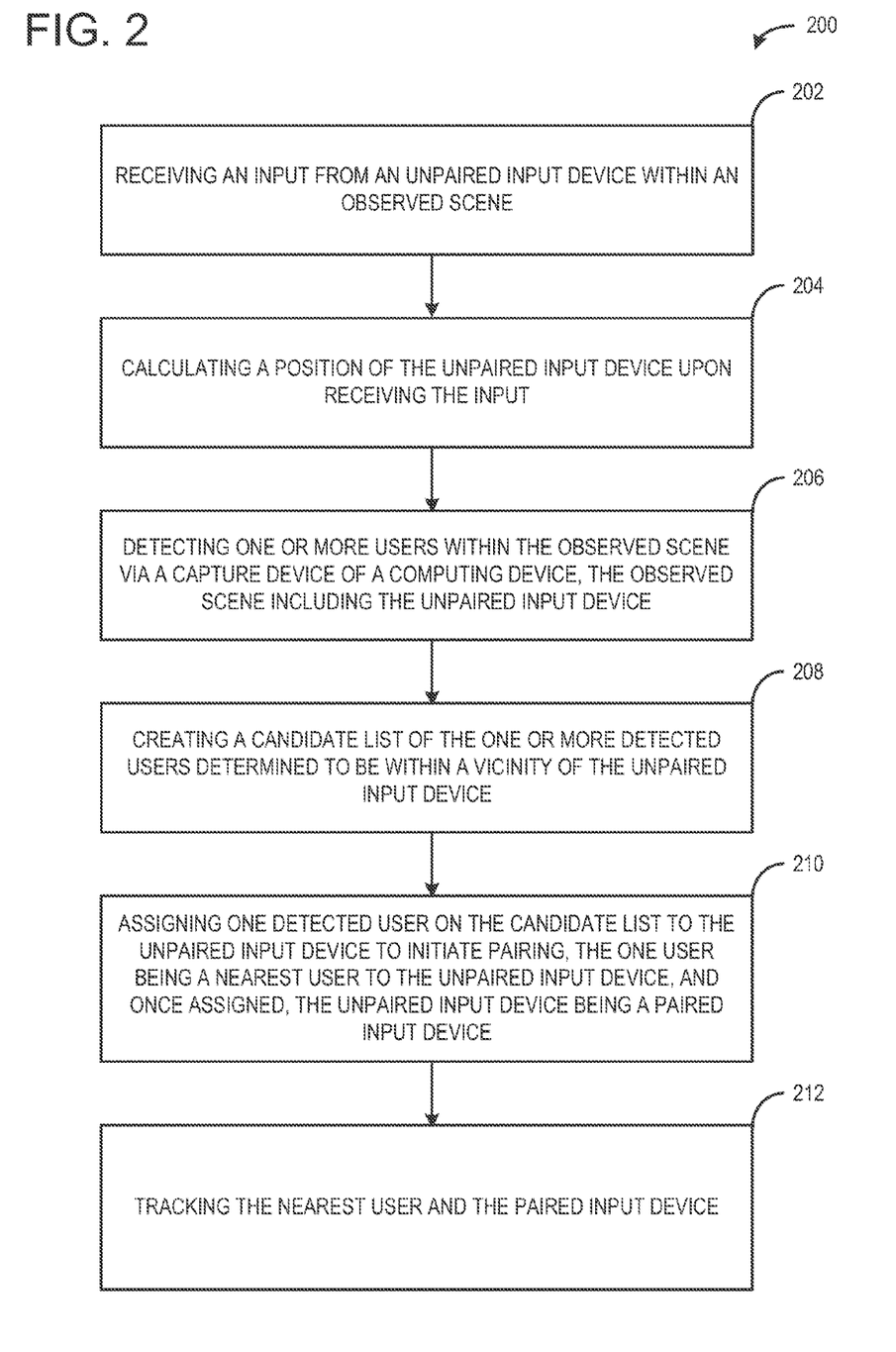
FIG. 2 is a flowchart that illustrates an example method for pairing the mobile device of FIG. 1 to a user according to an embodiment of the present disclosure.

FIG. 2 is a flowchart that illustrates an example method 200 for automatically pairing an input device to a user. Method 200 may be executed by a main computing device (e.g., gaming system 12) communicatively coupled to the input device (e.g., input device 20), for example.

At 202, method 200 includes receiving an input from an unpaired input device within an observed scene. For example, the received input may include a button press, a joystick movement, a D-pad movement, a touch event, and/or a detected motion of the unpaired input device. Further, the unpaired input device may include a motion sensor and/or a tag that may indicate the detected motion of the device. For example, the motion sensor may provide the detected motion input to the main computing device. As another example, a capture device of the main computing device may detect the detected motion of the tag associated with the unpaired input device. It will be appreciated that the unpaired input device emits a wireless signal that is received by the computing main device, and which contains an input device identifier by which the computing device may identify the input device. The input device 20 itself may be a game controller, mobile telephone, tablet computer, or other device capable of communicating with the computing device by a wireless signal. The wireless signal may be in the form of infrared, BLUETOOTH, WiFi, or other suitable wireless signal. Further, the input device identifier may be a GUID, MAC address, or other identifier that is used to distinguish the input device from other input devices in the scene.

At 204, method 200 includes calculating a position of the unpaired input device upon receiving the input. For example, the position may include a distance and an angle of the unpaired input device from the main computing device. In some embodiments, calculating the position may include a beamforming technique to determine the distance and the angle of the unpaired input device with respect to the main computing device. However, it will be appreciate that other techniques are possible without departing from the scope of this disclosure. For example, a two-dimensional positioning technique may be used. As another example, a three-dimensional positioning technique may be used. Further, in some embodiments the unpaired input device may include a tag and the position of the unpaired input device may be determined by locating a position of the tag. For example, the tag may include visible identifying information which may be detected by the main computing device. Thus, it will be appreciated that the tag may be an augmented reality marker that contains an optical code that is captured in an image taken by a camera, such as a visible light camera, which is associated with the main computing device, and the position of the marker in the scene can be determined by the main computing device.

At 206, method 200 includes detecting one or more users within the observed scene via a capture device of the main computing device, wherein the observed scene includes the unpaired input device. For example, capture device 18 may detect one or more users within the observed scene.

At 208, method 200 includes creating a candidate list of the one or more detected users determined to be within a vicinity of the unpaired computing device. For example, the candidate list may include user 10, user 24, and user 26 of FIG. 1. Further, the candidate list may include a distance between each user and the unpaired input device for which the input was received. Further, the candidate list may include a right hand distance, a left hand distance, and a geometric center distance of each user as measured with respect to the position of the unpaired input device. Further, such a candidate list may be sorted by proximity to the unpaired input device with respect to each distance.

It will be appreciated that the candidate list may be created in any suitable way. For example, the candidate list may be sorted by distance in ascending or descending order. As another example, one or more detected users may be excluded from the candidate list if such users exceed a threshold distance from the unpaired input device. In this way, those users which are too far away from the unpaired input device to be a conceivable candidate for pairing may be automatically removed from the candidate list to reduce processing time, for example.

At 210, method 200 includes assigning one detected user on the candidate list to the unpaired input device to initiate pairing, the one user being a nearest user to the unpaired computing device. Further, once assigned, the unpaired input device may be considered a paired input device. In some embodiments, the nearest user is a user on the candidate list with a strongest correlation to the unpaired input device. For example, the right hand distance, the left hand distance, and/or the geometric center distance of the nearest user may be the smallest distance from the input device included on the candidate list. In this way, the nearest user may be automatically paired to the unpaired input device. Further, assigning the nearest user to the unpaired input device may include automatically pairing a profile associated with the nearest user to the input device.

At 212, method 200 includes tracking the nearest user and the paired input device. For example, tracking the nearest user and the paired input device may include correlating a motion of the right hand, the left hand, and/or the geometric center of the nearest user to the motion of the paired computing device. For example, a motion of the user's right hand may provide input through interaction with an input device. In the example provided above, user 10 waves magic wand 20 to provide input to gaming system 12. The concurrent motion of the right hand of user 10 and magic wand 20 may be tracked using depth camera 18, for example. Since the motion of the right hand and the motion of the magic wand occur concurrently, the gaming system may determine that user 10 remains paired with magic wand 20.

It will be appreciated that method 200 is provided by way of example, and thus, is not meant to be limiting. Therefore, it is to be understood that method 200 may include additional and/or alternative steps than those illustrated in FIG. 2. For example, in some embodiments, a nearest user may interact with two different devices to provide input to a computing device via the two different devices. In such a scenario, both devices may be paired to the nearest user concurrently.

Further, it is to be understood that method 200 may be performed in any suitable order. Further still, it is to be understood that one or more steps may be omitted from method 200 without departing from the scope of this disclosure.

For example, method 200 may further include identifying each detected user within the observed scene by identifying a physical attribute of each detected user and matching the physical attribute of each detected user to a profile associated with each detected user. As non-limiting examples, the physical attribute may be detected using three-dimensional imaging, facial recognition, biometric based detection and/or other user identifying technologies. In this way, the detected user may be identified and paired to the input device such that the profile of the detected user is associated with the paired input device.

Figure 3:
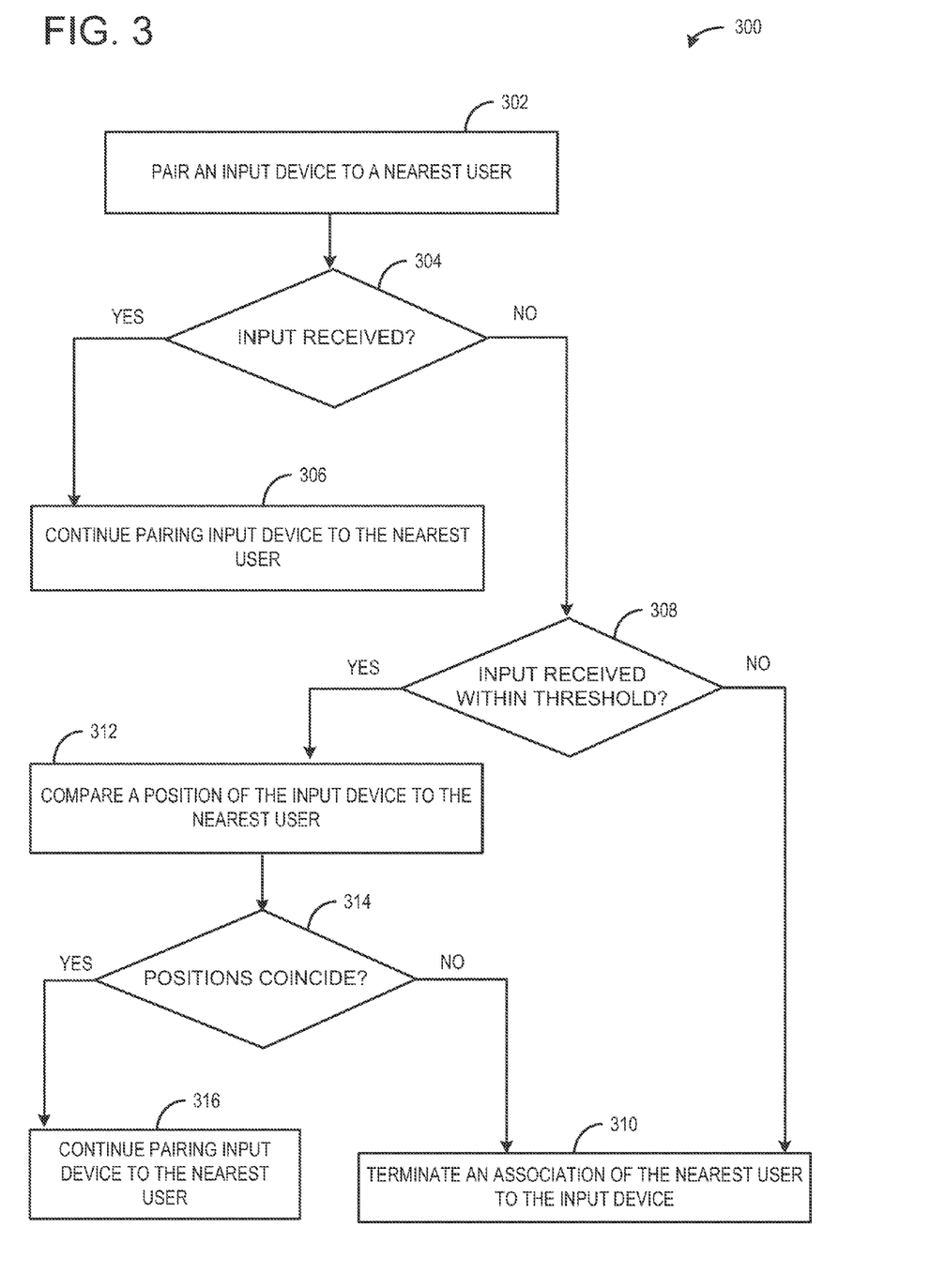
FIG. 3 is a flowchart that illustrates an example method for terminating the pairing of the mobile device of FIG. 1 to the user according to an embodiment of the present disclosure.

FIG. 3 is a flowchart that illustrates an example method 300 for terminating the pairing of an input device to a user. At 302, method 300 includes paring an input device to a nearest user. For example, method 200 may be used to pair the input device to the nearest user.

At 304, method 300 includes determining if input from the input device is received by a computing device. If the answer to 304 is YES, method 300 proceeds to 306. If the answer to 304 is NO, method 300 proceeds to 308.

At 306, method 300 includes continuing to pair the input device to the nearest user. For example, if the nearest user is interacting with the input device, then the nearest user may continue to be paired to the input device.

At 308, method 300 includes determining if input from the input device is received by the computing device within a threshold period of time. For example, the input device may be temporarily idle. As such, the nearest user may not be actively interacting with the input device at a particular moment in time. For example, the nearest user may interact with the input device to cast a spell, and the input device may be temporarily idle immediately after casting the spell. For example, the nearest user may be waiting for another game player to cast an opposing spell. It will be appreciated that the threshold period of time may be any suitable period of time. Further, the threshold period of time may vary for different settings, different games, and/or different non-game applications. As such, the threshold period of time may be customizable by a user and/or by a game/application developer. If the answer to 308 is NO, method 300 continues to 310. If the answer to 308 is YES, method 300 continues to 312.

At 310, method 300 includes terminating an association of the nearest user to the input device. For example, the input device may be idle because the nearest user set the input device down and/or decided to end a gaming session. Since the user does not interact with the input device within the threshold period of time, the input device may be unpaired from the nearest user, for example. As another example, the nearest user may hand off the input device to another user, and therefore the nearest user may be a former nearest user. Such an example of transferring a paired input device from one user to another user is described in further detail below with respect to FIG. 4.

At 312, method 300 includes comparing a position of the input device to a position of the nearest user. For example, the position of the input device may be compared to a position of a right hand of the nearest user.

At 314, method 300 includes determining if the position of the input device is within a vicinity of the position of the nearest user. For example, the vicinity may be a threshold distance from the input device. As one non-limiting example, the threshold distance may be a twelve inch radius around a perimeter of the paired input device. However, it will be appreciated that other threshold distances are possible without departing from the scope of this disclosure. Further, if the nearest user is within the threshold distance, then the user may be within the vicinity of the input device. If the answer to 314 is NO, method 300 continues to 310 and an association of the nearest user to the input device is terminated. If the answer to 314 is YES, method 300 continues to 316.

At 316, method 300 includes continuing paring the input device to the nearest user. For example, the input device may be idle yet the user may still be holding the input device. Therefore, the nearest user may still be within the vicinity of the input device. Further, the nearest user may be providing periodic input via interaction with the input device; however, the periodic input may be provided within the threshold period of time. Thus, the nearest user may remain paired with the input device.

It will be appreciated that method 300 is provided by way of example, and thus, is not meant to be limiting. Therefore, it is to be understood that method 300 may include additional and/or alternative steps than those illustrated in FIG. 3. Further, it is to be understood that method 300 may be performed in any suitable order. Further still, it is to be understood that one or more steps may be omitted from method 300 without departing from the scope of this disclosure.

Figure 4:
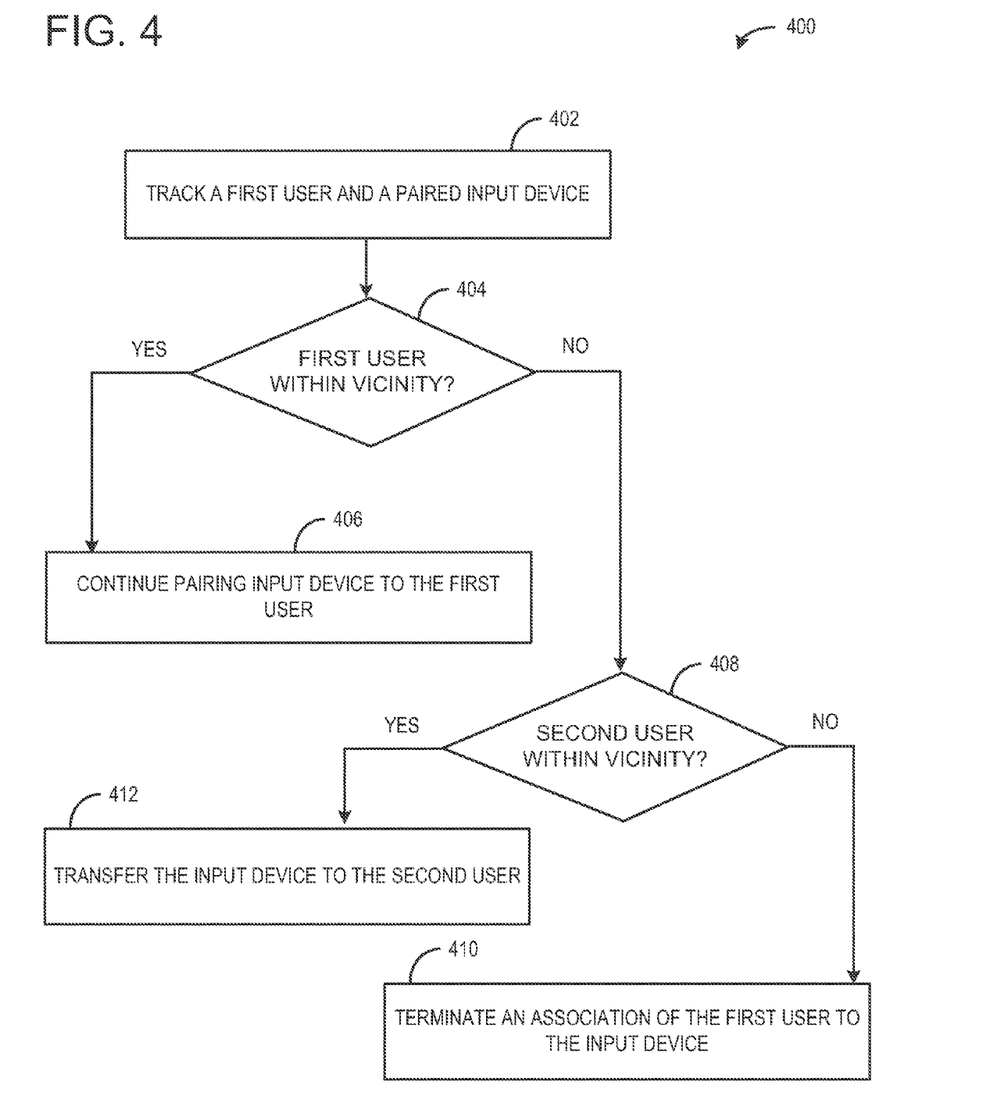
FIG. 4 is a flowchart that illustrates an example method for transferring the pairing of the mobile device of FIG. 1 to another user according to an embodiment of the present disclosure.

FIG. 4 is a flowchart that illustrates an example method 400 for transferring the pairing of an input device to another user. At 402, method 400 includes tracking a first user and a paired input device, wherein the first user is a nearest user.

At 404, method 400 includes determining if a position of the first user is within a vicinity of the paired input device. For example, the vicinity may be a threshold distance from the paired input device, as described above. If the answer to 404 is YES, method 400 continues to 406. If the answer to 404 is NO, method 400 continues to 408.

At 406, method 400 includes continuing to track a position of the first user and the paired input device. As such, the first user may remain within the vicinity of the paired input device. Therefore, the first user may continue to interact with the input device to control aspects of a video game, for example.

At 408, method 400 includes determining if a position of a second user is within the vicinity of the paired input device. If the answer to 408 is NO, method 400 continues to 410. If the answer to 408 is YES, method 400 continues to 412.

At 410, method 400 includes terminating an association of the first user to the paired input device. For example, the first user may 'hand off' the paired input device to the second user. Therefore, in such a scenario the first user may be a former nearest user, and thus the first user may be unpaired from the input device.

At 412, method 400 includes transferring the paired input device to the second user. As such, an association between the second user and the paired input device may be formed. Therefore, in such a scenario, the second user may be a current nearest user to the input device. As described above, second user may receive the input device from the first user as a hand off. Further, it will be appreciated that the second user and the paired input device may be tracked, as described above.

It will be appreciated that method 400 is provided by way of example, and thus, is not meant to be limiting. Therefore, it is to be understood that method 400 may include additional and/or alternative steps than those illustrated in FIG. 4. Further, it is to be understood that method 400 may be performed in any suitable order. Further still, it is to be understood that one or more steps may be omitted from method 200 without departing from the scope of this disclosure.

As described above, by pairing an input device to a user based on a position of the input device and a position of the user, the user can be automatically paired to the input device.

In this way, the user can avoid having to log into a user account or having to perform other manual inputs to pair a device. Further, by automatically pairing the device to the user in this way, the user may pick up a new device, switch devices with another user, use more than one device, etc. and the one or more devices may be paired to the user automatically in real-time. As such, the gaming experience may be enhanced. For example, using the above example, the user may interact with the wand input device to cast a spell, and the user may switch to interact with the controller to throw a punch or another physical attack. As such, the gaming experience may be enhanced by allowing the user to interact with different input devices which may allow different gaming controls, while switching the pairing of the user between the different input devices automatically. In this way, the gaming experience may be enhanced.

In some embodiments, the above described methods and processes may be tied to a computing system including one or more computers. In particular, the methods and processes described herein may be implemented as a computer application, computer service, computer API, computer library, and/or other computer program product.

Figure 5:
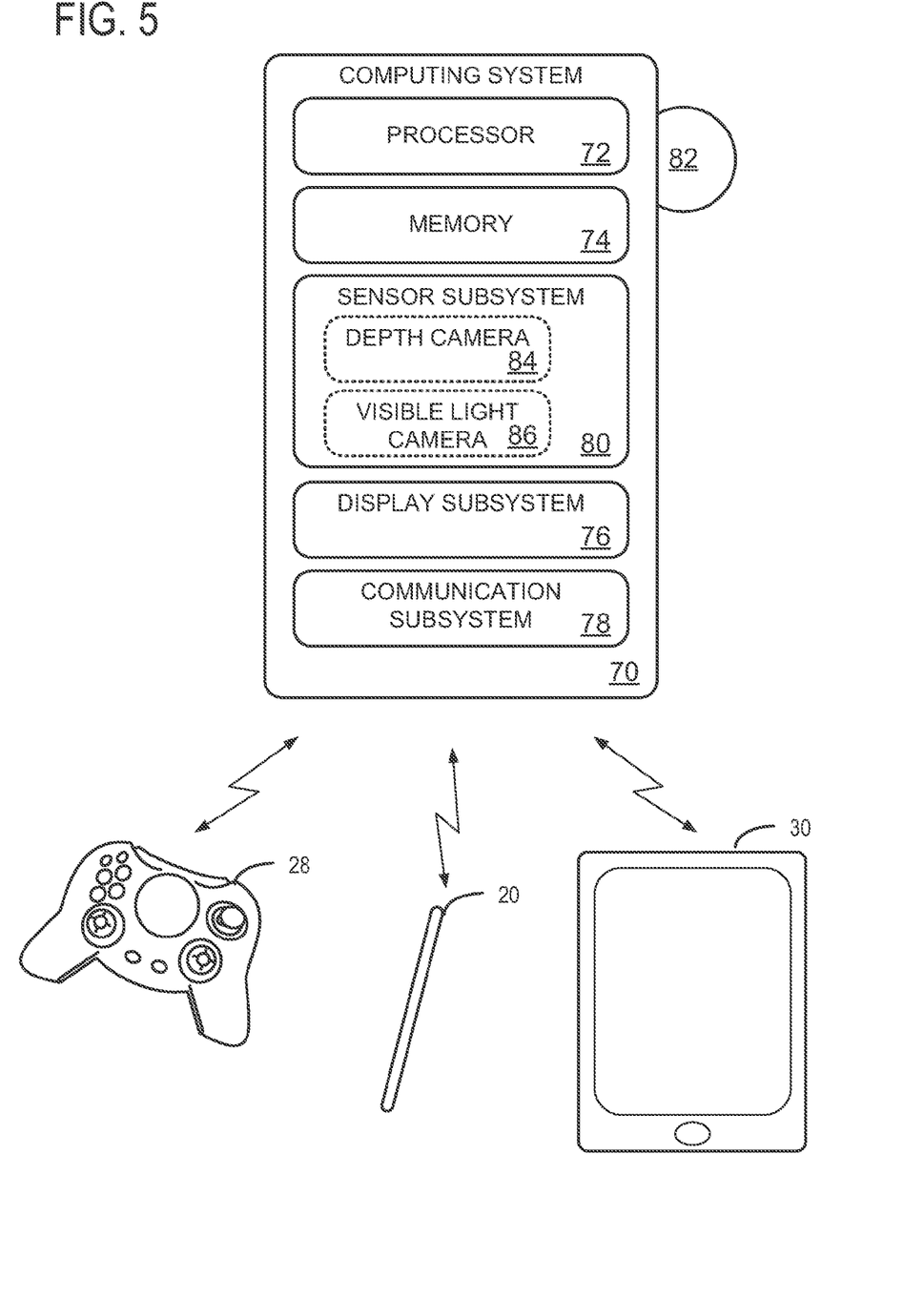
FIG. 5 is a schematic view of a computing system that may be used as the gaming system of FIG. 1.

FIG. 5 schematically shows a non-limiting computing system 70 that may perform one or more of the above described methods and processes. Computing system 70 is shown in simplified form. It is to be understood that virtually any computer architecture may be used without departing from the scope of this disclosure. In different embodiments, computing system 70 may take the form of a mainframe computer, server computer, desktop computer, laptop computer, tablet computer, home entertainment computer, network computing device, mobile computing device, mobile communication device, gaming device, etc.

Computing system 70 includes a processor 72 and a memory 74. Computing system 70 may optionally include a display subsystem 76, communication subsystem 78, sensor subsystem 80 and/or other components not shown in FIG. 5. Computing system 70 may also optionally include various user input devices such as keyboards, mice, game controllers, cameras, microphones, and/or touch screens, for example. FIG. 6 shows a game controller 28, magic wand 20, and a mobile computing device 30, which may provide input to computing system 70. As described above, such input devices may be automatically paired to a user depending on a proximity of the user to one or more of the input devices.

Processor 72 may include one or more physical devices configured to execute one or more instructions. For example, the processor may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The processor may include one or more processors that are configured to execute software instructions. Additionally or alternatively, the processor may include one or more hardware or firmware logic machines configured to execute hardware or firmware instructions. Processors of the processor may be single core or multicore, and the programs executed thereon may be configured for parallel or distributed processing. The processor may optionally include individual components that are distributed throughout two or more devices, which may be remotely located and/or configured for coordinated processing. One or more aspects of the processor may be virtualized and executed by remotely accessible networked computing devices configured in a cloud computing configuration.

Memory 74 may include one or more physical, non-transitory, devices configured to hold data and/or instructions executable by the processor to implement the herein described methods and processes. When such methods and processes are implemented, the state of memory 74 may be transformed (e.g., to hold different data).

Memory 74 may include removable media and/or built-in devices. Memory 74 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Memory 74 may include devices with one or more of the following characteristics: volatile, nonvolatile, dynamic, static, read/write, read-only, random access, sequential access, location addressable, file addressable, and content addressable. In some embodiments, processor 72 and memory 74 may be integrated into one or more common devices, such as an application specific integrated circuit or a system on a chip.

FIG. 5 also shows an aspect of the memory in the form of removable computer-readable storage media 82, which may be used to store and/or transfer data and/or instructions executable to implement the herein described methods and processes. Removable computer-readable storage media 82 may take the form of CDs, DVDs, HD-DVDs, Blu-Ray Discs, EEPROMs, and/or floppy disks, among others.

It is to be appreciated that memory 74 includes one or more physical, non-transitory devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal.

The terms "module," "program," and "engine" may be used to describe an aspect of computing system 70 that is implemented to perform one or more particular functions. In some cases, such a module, program, or engine may be instantiated via processor 72 executing instructions held by memory 74. It is to be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" are meant to encompass individual or groups of executable files, data files, libraries, drivers, scripts, database records, etc.

It is to be appreciated that a "service", as used herein, may be an application program executable across multiple user sessions and available to one or more system components, programs, and/or other services. In some implementations, a service may run on a server responsive to a request from a client.

When included, display subsystem 76 may be used to present a visual representation of data held by memory 74. As the herein described methods and processes change the data held by the memory, and thus transform the state of the memory, the state of display subsystem 76 may likewise be transformed to visually represent changes in the underlying data. Display subsystem 76 may include one or more display devices utilizing virtually any type of technology. Such display devices may be combined with processor 72 and/or memory 74 in a shared enclosure, or such display devices may be peripheral display devices.

When included, communication subsystem 78 may be configured to communicatively couple computing system 70 with one or more other computing devices. Communication subsystem 78 may include wired and/or wireless communication devices compatible with one or more different communication protocols. As nonlimiting examples, the communication subsystem may be configured for communication via a wireless telephone network, a wireless local area network, a wired local area network, a wireless wide area network, a wired wide area network, etc. In some embodiments, the communication subsystem may allow computing system 70 to send and/or receive messages to and/or from other devices via a network such as the Internet. Further, communication subsystem may be configured for beamforming to locate a position of an input device within an observed scene, as described above.

Sensor subsystem 80 may include one or more sensors configured to sense one or more human subjects, as described above. For example, the sensor subsystem 80 may comprise one or more image sensors, motion sensors such as accelerometers, touch pads, touch screens, and/or any other suitable sensors. Therefore, sensor subsystem 80 may be configured to provide observation information to processor 72, for example. As described above, observation information such as image data, motion sensor data, and/or any other suitable sensor data may be used to perform such tasks as determining a position of each of a plurality of joints of one or more human subjects.

In some embodiments, sensor subsystem 80 may include a depth camera 84 (e.g., depth camera 18 of FIG. 1). Depth camera 84 may include left and right cameras of a stereoscopic vision system, for example. Time-resolved images from both cameras may be registered to each other and combined to yield depth-resolved video.

In other embodiments, depth camera 84 may be a structured light depth camera configured to project a structured infrared illumination comprising numerous, discrete features (e.g., lines or dots). Depth camera 84 may be configured to image the structured illumination reflected from a scene onto which the structured illumination is projected. Based on the spacings between adjacent features in the various regions of the imaged scene, a depth image of the scene may be constructed.

In other embodiments, depth camera 84 may be a time-of-flight camera configured to project a pulsed infrared illumination onto the scene. The depth camera may include two cameras configured to detect the pulsed illumination reflected from the scene. Both cameras may include an electronic shutter synchronized to the pulsed illumination, but the integration times for the cameras may differ, such that a pixel-resolved time-of-flight of the pulsed illumination, from the source to the scene and then to the cameras, is discernable from the relative amounts of light received in corresponding pixels of the two cameras.

In some embodiments, sensor subsystem 80 may include a visible light camera 86. Virtually any type of digital camera technology may be used without departing from the scope of this disclosure. As a non-limiting example, visible light camera 86 may include a charge coupled device image sensor. Further, visible light camera 86 may be configured to detect an input device tag to locate a position of an input device within an observed scene, as described above.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method for automatically pairing an input device to a user, the method executed by a computing device communicatively coupled to the input device, the method comprising:
receiving an input from an unpaired input device within an observed scene;
calculating a position of the unpaired input device upon receiving the input, the position including a distance and an angle relative to the computing device;
detecting one or more users within the observed scene via a capture device of the computing device, the observed scene including the unpaired input device;
creating a candidate list of the one or more detected users determined to be within a vicinity of the unpaired input device, the candidate list including a distance between each user and the unpaired input device;
assigning a first user from the candidate list to the unpaired input device to initiate pairing, the first user being a nearest user to the unpaired input device, and once assigned, the unpaired input device being a first paired input device;
switching the first paired input device from the first user to a second user when the second user is closer to the first paired input device than the first user;
switching a second paired input device of the second user from the second user to the first user when the first user is closer to the second paired input device than the second user; and
concurrently pairing both the first paired input device and the second paired input device to the first user when the first user is closer than the second user to both the first paired input device and the second paired input device.

2. The method of claim 1, further comprising identifying each detected user within the observed scene by identifying a physical attribute of each detected user and matching the physical attribute of each detected user to a profile associated with each detected user.

3. The method of claim 2, wherein the physical attribute is detected using three-dimensional imaging, facial recognition, or biometrics.

4. The method of claim 1, wherein the received input includes at least one of a button press, a joystick movement, a D-pad movement, a touch event, and a detected motion.

5. The method of claim 4, wherein the unpaired input device includes a motion sensor to sense the detected motion, the motion sensor providing the detected motion input to the computing device.

6. The method of claim 1, wherein the unpaired input device includes a tag, and wherein the position of the unpaired input device is calculated based upon a detected position of the tag.

7. The method of claim 1, wherein calculating the position of the unpaired input device upon receiving the input includes a beamforming technique to determine the distance and the angle of the unpaired input device from the computing device.

8. The method of claim 1, wherein the candidate list includes a body portion distance, wherein the body portion distance is at least one of a hand distance, a geometric center distance, a leg distance, a knee distance, a shoulder distance, and an elbow distance of each detected user as measured with respect to the position of the unpaired input device.

9. The method of claim 8, wherein the nearest user is a user on the candidate list with a strongest correlation to the unpaired input device, wherein one body portion distance for the nearest user has the strongest correlation to the unpaired input device.

10. The method of claim 1, wherein assigning the nearest user to the unpaired input device includes automatically pairing a profile associated with the nearest user to the unpaired input device.

11. The method of claim 1, further comprising tracking the nearest user and the first paired input device by correlating a motion of a body portion of the nearest user to a motion of the first paired input device, the motion of the nearest user's body portion including the nearest user providing input to the computing device via interaction with the first paired input device.

12. The method of claim 1, further comprising transferring the first paired input device to a second user if a position of the second user has the strongest correlation to the position of the first paired input device, the second user being another detected user on the candidate list.

13. The method of claim 1, further comprising pairing more than one input device to the user.

14. The method of claim 1, further comprising:
maintaining nearest user pairing to the first paired input device until a pair terminating or pair transferring event occurs.

15. The method of claim 14, further comprising:
terminating an association of the first user to the first paired input device if input from the first paired input device is not received for a threshold period of time, and after the association is terminated.

16. A non-volatile memory holding instructions executable by a processor to:
receive an input from an unpaired input device within an observed scene;
calculate a position of the unpaired input device upon receiving the input, the position including a distance and an angle from a computing device;
detect one or more users within the observed scene via a capture device of the computing device;
create a candidate list of the one or more detected users determined to be within a vicinity of the unpaired input device, the candidate list including a distance between each user and the unpaired input device;
assign a first user from the candidate list to the unpaired input device to initiate pairing, the first user being a nearest user to the unpaired input device, and once assigned, the unpaired input device being a first paired input device;
switching the first paired input device from the first user to a second user when the second user is closer to the first paired input device than the first user;
switching a second paired input device of the second user from the second user to the first user when the first user is closer to the second paired input device than the second user; and
concurrently pairing both the first paired input device and the second paired input device to the first user when the first user is closer than the second user to both the first paired input device and the second paired input device.

17. The memory of claim 16, further comprising instructions executable by a processor to identify each detected user within the observed scene by identifying a physical attribute of each detected user and to match the physical attribute of each detected user to a profile associated with each detected user, wherein the physical attribute is detected using three-dimensional imaging, facial recognition, or biometrics.

18. The memory of claim 16, further comprising instructions executable by a processor to track the nearest user and the first paired input device by correlating a motion of a body portion of the nearest user to a motion of the first paired input device, the motion of the nearest user's body portion including the nearest user providing input to the computing device via interaction with the first paired input device.

19. The memory of claim 16, further comprising instructions executable by a processor to terminate an association of the nearest user to the first paired input device if input from the first paired input device is not received for a threshold period of time, and if the association is terminated, returning the first paired input device to an unpaired state.

20. A method for automatically pairing an input device to a user, the method executed by a computing device communicatively coupled to the input device, the method comprising:
receiving an input from an unpaired input device within an observed scene;
calculating a position of the unpaired input device upon receiving the input, the position including a distance and an angle relative to the computing device;
detecting one or more users within the observed scene via a capture device of the computing device;
identifying each detected user within the observed scene by identifying a physical attribute of each detected user and matching the physical attribute of each detected user to a profile associated with each detected user;
creating a candidate list of the one or more identified users determined to be within a vicinity of the unpaired input device, the candidate list including a right hand distance, a left hand distance, and a geometric center distance between each user and the unpaired input device;
maintaining nearest user pairing to the paired input device until a pair terminating or pair transferring event occurs;
assigning a first user from the candidate list to the unpaired input device to initiate pairing, the first user being a nearest user to the unpaired input device, the right hand distance, the left hand distance, or the geometric center distance for the nearest user having a strongest correlation to the unpaired input device, and once assigned, the unpaired input device being a first paired input device;
tracking the nearest user and the first paired input device by correlating a motion of the nearest user's right hand or left hand to a motion of the first paired input device, the motion of the nearest user's right hand or left hand including the nearest user providing input to the computing device via interaction with the first paired input device;
terminating an association of the nearest user to the first paired input device if input from the first paired input device is not received for a threshold period of time, and if the association is terminated;
switching the first paired input device from the first user to a second user when the second user is closer to the first paired input device than the first user; and switching a second paired input device of the second user from the second user to the first user when the first user is closer to the second paired input device than the second user;

transferring the first paired input device to the second user if a position of the second user has the strongest correlation to the position of the first paired input device, the second user being another detected user on the candidate list; and concurrently pairing both the first paired input device and the second paired input device to the first user when the first user is closer than the second user to both the first paired input device and the second paired input device.

\* \* \* \* \*